United States Patent
Criel et al.

(10) Patent No.: US 9,731,485 B2
(45) Date of Patent: Aug. 15, 2017

(54) HOLLOW BODY, PROCESS FOR MANUFACTURING IT AND USE THEREOF IN A VEHICLE

(71) Applicant: Inergy Automotive Systems Research (Societe Anonyme), Brussels (BE)

(72) Inventors: Bjorn Criel, Sint-Martens-Lennik (BE); Pierre De Keyzer, Brussels (BE); Eric Boucaux, Elincourt Sainte Marguerite (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 14/367,668

(22) PCT Filed: Dec. 21, 2012

(86) PCT No.: PCT/EP2012/076827
§ 371 (c)(1),
(2) Date: Jun. 20, 2014

(87) PCT Pub. No.: WO2013/093089
PCT Pub. Date: Jun. 27, 2013

(65) Prior Publication Data
US 2015/0027633 A1 Jan. 29, 2015

(30) Foreign Application Priority Data
Dec. 21, 2011 (EP) ..................... 11194730

(51) Int. Cl.
*B29C 65/00* (2006.01)
*B32B 37/04* (2006.01)
(Continued)

(52) U.S. Cl.
CPC .......... *B32B 37/04* (2013.01); *B29C 49/0005* (2013.01); *B29C 65/02* (2013.01);
(Continued)

(58) Field of Classification Search
CPC ............ B29C 65/5092; B29C 65/7847; B25B 11/005; B25B 11/007
See application file for complete search history.

(56) References Cited

U.S. PATENT DOCUMENTS 3,574,040 A * 4/1971 Chitwood et al. .... B29C 70/386
156/350
4,244,771 A * 1/1981 Pierce ........................... 156/499
(Continued)

FOREIGN PATENT DOCUMENTS

| EP | 0 356 072 A2 | 2/1990 |
| EP | 0 356 072 A3 | 2/1990 |

(Continued)

OTHER PUBLICATIONS

International Search Report issued Jul. 25, 2013, in PCT/EP12/076827 filed Dec. 21, 2012.
(Continued)

*Primary Examiner* — John Goff
(74) *Attorney, Agent, or Firm* — Oblon, McClelland, Maier & Neustadt, L.L.P.

(57) ABSTRACT

A process for manufacturing a hollow body including a thermoplastic wall and a fibrous reinforcement welded on at least one portion of the surface of the wall, or its outer surface, the fibrous reinforcement including a thermoplastic similar to or compatible with that of the wall of the hollow body, having a thickness of at least 1 mm and from 30 to 60% in weight of fibers, the method including heating a portion of the outer surface of the hollow body where the reinforcement will be welded; heating the fibrous reinforcement to soften or melt the thermoplastic of the reinforcement; and moving the reinforcement and applying the reinforcement to the portion of the outer surface of the hollow body. The applying the reinforcement includes: applying an initial pressure on at least one portion of the reinforcement;
(Continued)

Figure 1:
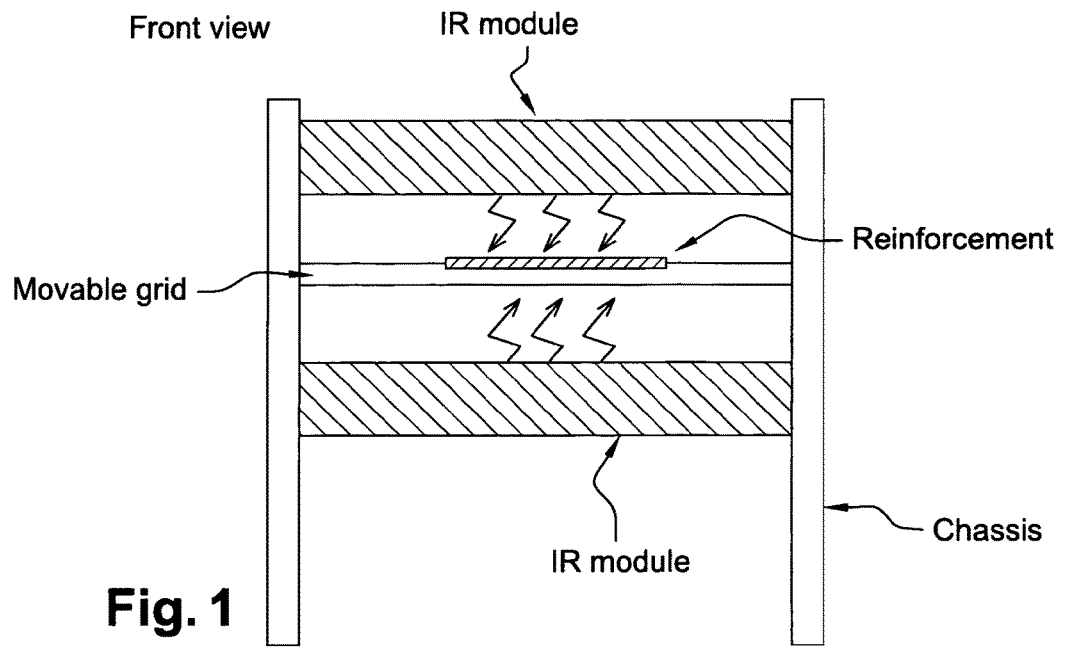

and applying pressure for a final welding using robotized pressure applying mechanism.

20 Claims, 2 Drawing Sheets

(51) Int. Cl.

| | | |
|---|---|---|
| *B29C 65/14* | (2006.01) | |
| *B29C 65/78* | (2006.01) | |
| *B29C 65/02* | (2006.01) | |
| *B60K 15/03* | (2006.01) | |
| *B29C 49/00* | (2006.01) | |
| B29L 31/00 | (2006.01) | |
| B60K 13/04 | (2006.01) | |
| B29L 31/30 | (2006.01) | |

(52) U.S. Cl.
CPC ...... *B29C 65/1412* (2013.01); *B29C 65/1432* (2013.01); *B29C 65/1467* (2013.01); *B29C 65/1496* (2013.01); *B29C 65/7847* (2013.01); *B29C 66/1122* (2013.01); *B29C 66/532* (2013.01); *B29C 66/721* (2013.01); *B29C 66/7352* (2013.01); *B29C 66/73921* (2013.01); *B29C 66/8362* (2013.01); *B29C 66/863* (2013.01); *B60K 15/03177* (2013.01); *B29C 66/301* (2013.01); *B29C 66/492* (2013.01); *B29C 66/5326* (2013.01); *B29C 66/71* (2013.01); *B29C 66/7212* (2013.01); *B29C 66/72141* (2013.01); *B29K 2313/00* (2013.01); *B29L 2031/3055* (2013.01); *B29L 2031/7172* (2013.01); *B32B 2305/00* (2013.01); *B60K 13/04* (2013.01); *B60K 2015/03032* (2013.01); *B60K 2015/0346* (2013.01)

(56) References Cited

U.S. PATENT DOCUMENTS

| | | | |
|---|---|---|---|
| 4,531,992 A * | 7/1985 | Eaton | 156/152 |
| 4,946,551 A | 8/1990 | Ishige et al. | |
| 5,177,340 A * | 1/1993 | Zaffiro | 219/494 |
| 5,194,212 A | 3/1993 | Bonnett | |
| 5,427,518 A * | 6/1995 | Morizot | B29C 31/085 100/211 |
| 7,206,665 B2 * | 4/2007 | Groppe | 700/245 |
| 8,967,418 B2 * | 3/2015 | Martin et al. | 220/589 |
| 2005/0209735 A1 | 9/2005 | Groppe | |
| 2008/0157437 A1* | 7/2008 | Nelson et al. | 264/405 |
| 2013/0037549 A1 | 2/2013 | Martin et al. | |

FOREIGN PATENT DOCUMENTS

| | | |
|---|---|---|
| EP | 2 607 134 | 6/2013 |
| FR | 2 914 874 A1 | 10/2008 |
| JP | 4-122611 A | 4/1992 |
| JP | 6-270177 | 9/1994 |
| JP | 10-34476 | 2/1998 |
| JP | 2007-111927 | 5/2007 |
| WO | WO 2011/110519 A1 | 9/2011 |

OTHER PUBLICATIONS

European Search Report issued Jun. 15, 2012, in European Patent Application No. 11194730.5 filed Dec. 21, 2011.
Schmidt, "Grossflaechige Bauteile mit Infrarotstrahlung schweissen", Kunstoffe International, XP-001525364, Oct. 2006, 3 pages.
Combined Chinese Office Action and Search Report issued Mar. 31, 2016 in Patent Application No. 201280063626.6 (with English translation of categories of cited documents).
Office Action issued Dec. 5, 2016 in Japanese Patent Application No. 2014-548099.
Opposition to European Patent No. 2 794 322 (Application No. 12 816 066.0) issued Dec. 9, 2016.

\* cited by examiner

HOLLOW BODY, PROCESS FOR MANUFACTURING IT AND USE THEREOF IN A VEHICLE

The present invention relates to a hollow body, to a process for manufacturing it and to the use thereof in a vehicle.

Hybrid engine generally refers to the combination of a combustion engine and an electric motor.

There is a general operating principle for hybrid vehicles that consists in operating either the electric motor, or the combustion engine, or both at the same time, depending on the model.

One of the particular principles is as follows:
during stationary phases (when the vehicle is stationary), both engines are shut down;
at start-up, it is the electric motor which sets the car in motion, up to higher speeds (25 or 30 km/h);
when higher speeds are reached, the combustion engine takes over;
in the event of fast acceleration, both engines operate at the same time, which makes it possible to have accelerations equivalent to the engine of the same power, or even greater accelerations;
in the decelerating and braking phase, kinetic energy is used to recharge the batteries (it should be noted that this functionality is not available in all the hybrid engines that are currently commercially available).

It results from this principle that the combustion engine does not operate constantly and that consequently, the purge phases of the canister (activated carbon filter that prevents fuel vapours being released to the atmosphere) cannot be carried out normally since during these purge phases, air, which is optionally preheated, is circulated through the canister in order to regenerate it (i.e. in order to desorb the fuel vapours that are adsorbed therein), this air then being admitted into the engine in order to be burnt therein. Moreover, hybrid vehicles were developed in order to reduce fuel consumption and emissions of exhaust gases, which makes the engine management for burning the fuel vapours coming from the canister more complex, or even impossible, without deteriorating the engine performance.

Therefore, the fuel tanks of these engines are generally sealed (typically to a pressure of around 300-400 mbar) in order to limit loading of the canister; resulting in a pressure variation induced by temperature fluctuations.

As a result, these tanks must have, compared to the fuel tanks of conventional combustion engines, an improved mechanical strength, in particular in the case of plastic tanks.

The solution currently on the market consists of a metal tank of sizeable thickness, which considerably increases the weight of the tank and thus increases the fuel consumption and the exhaust gas emissions. Moreover, plastic fuel tanks offer more flexibility for the design (to optimize the volume available in the vehicle).

Other known solutions to the aforementioned pressure problem may consist of an increase of the wall thickness of plastic tanks and/or in the use of internal reinforcements (rods, partitions, etc.) connecting the two walls together, but these solutions generally adversely affect the weight, reduce the working volume of the tank and increase the cost of the tank. Another solution may consist in providing the tank with kiss points (i.e. local welds of the lower wall and of the upper wall), but this solution leads to a reduction of the working volume of the tank.

Patent application WO 2011/110519 in the name of the Applicant discloses a process for manufacturing a fuel tank comprising a thermoplastic wall and a fibrous reinforcement on at least one portion of its outer surface, according to which:
a molten thermoplastic parison is moulded in a mould and is left to cool in order to obtain the wall of the tank;
a fibrous reinforcement is chosen that comprises a thermoplastic similar to or compatible with that of the wall of the tank and this reinforcement is heated so as to soften or even melt the thermoplastic of the reinforcement; and
the reinforcement is applied to the outer surface of the tank by exerting a force that makes it possible to weld the two elements.

This document recommends to limit the thickness of the reinforcement (which should ideally be comprised between 0.2 and 1 mm) namely in order to be able to weld said reinforcement on the tank by IR (Infra Red) radiation after/while heating both elements at the same time through said radiation (in other words: the tank is heated by the IR radiation passing through the reinforcement). However, as also stated in this document, it is preferable to have a reinforcement with a high tensile strength (and hence, a higher thickness) in order to enhance its reinforcing effect. Such a higher thickness would however require heating the tank and the reinforcement separately so that the latter should be handled (gripped and transported) before being welded on the former, while the thermoplastic of said reinforcement should remain soft/molten in order to allow welding.

The Applicant has found that provided the thickness of said reinforcement is at least 1 mm and provided that its fibre content is comprised between a given range, such a handling and welding is nevertheless possible, leading to a new and interesting structure in terms of mechanical resistance, which is not only useful for hybrid vehicles fuel tanks as described above but also, for any other hollow body used on a vehicle that would be submitted to high thermal and/or mechanical stresses.

Therefore, the invention relates to a hollow body comprising a thermoplastic wall and a fibrous reinforcement welded on at least one portion of the surface, preferably the outer surface, of said wall, the fibrous reinforcement comprising a thermoplastic similar to or compatible with that of the wall of the hollow body, having a thickness of at least 1 mm and comprising from 30 to 60% in weight of fibres.

The hollow body according to the invention comprises a wall that defines an internal volume for storing and/or transporting a fluid on board a vehicle. This hollow body is made of a thermoplastic, preferably by blow moulding. The invention is interesting for hollow bodies submitted to high thermal and/or mechanical stresses, like (preferably hybrid) vehicle fuel tanks, filler pipes, turbo charger ducts and ammonia precursors (like urea or solids on which ammonia is absorbed) tanks used in SCR (Selective Catalytic Reduction) systems for reducing NOx gases in exhaust gases.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly, random copolymers, linear block copolymers, non-linear block copolymers, and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersity of their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, clays, salts and other inorganic derivatives, natural fibres or polymeric fibres. It is also possible to use multilayer structures consisting of stacked layers bonded together, comprising at least one of the polymers or copolymers described above.

One polymer often employed is polyethylene. Excellent results have been obtained with high-density polyethylene (HDPE).

The wall of the hollow body may be composed of a single thermoplastic layer, or of two layers. One or more other possible additional layers may, advantageously, be composed of layers made of a material that is a barrier to liquids and/or gases, depending on the fluid stored/transported by the hollow body. Preferably, the nature and thickness of the barrier layer are chosen so as to minimize the permeability of liquids and gases in contact with the internal surface of the hollow body. When the hollow body is a fuel tank, preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel. The tank according to this embodiment of the invention preferably comprises an EVOH-based barrier layer located between HDPE-based outer layers.

The fibrous reinforcement may be in many forms; it is generally a sheet comprising chopped fibres or long fibres or continuous fibres, which fibres may or may not be woven. Generally, the chopped fibres have final lengths of a few tens/hundreds of microns. For long fibres, the residual lengths are a few millimeters. When the length of the fibres used is several tens of centimeters, these fibres are referred to as continuous fibres or continuous filaments. Continuous fibres are preferred and in particular continuous fibres that are woven.

These fibres may be based on glass, on carbon, on a polymer (such as a polyamide, for example an aromatic polyamide such as an aramid), or may even be natural fibres such as hemp or sisal. They are preferably glass fibres (of E-glass, S-glass or other glass type).

The fibres of the fibrous reinforcement according to the invention are preferably compatible with the thermoplastic and therefore, generally, compatible with polyolefins and, in particular, with HDPE. In order to obtain this compatibility, the fibres may be sized (surface-treated) with a compatibilizing substance such as a silane. A reactive HDPE-type binder may also be used. Within this context, reactive functional groups of maleic anhydride type may advantageously be used.

According to the invention, the fibrous reinforcement comprises a thermoplastic that is compatible with that of the hollow body or even identical thereto. In the case of fuel tanks, this is generally polyethylene and in particular HDPE.

This reinforcement has a thickness of at least 1 mm, preferably at least 1.5 mm.

The fibre content in the reinforcement is comprised between 30% and 60%, ideally around 45% in weight. The thermoplastic is preferably melted around/in the bulk of the fibres so as to form a homogeneous sheet/plate having thermoplastic on at least one portion of its surface so as to facilitate welding. In practice, this can be achieved by compression moulding, injection moulding, spray moulding, vacuum moulding or else calendering. Preferably, the process for producing the reinforcement will be compression moulding or spray moulding, more preferably compression moulding several layers made respectively of fibres and of thermoplastic together, the outer layers being preferably thermoplastic ones. This compression moulding may be a batch process (generally comprising heating and pressing together several layers made respectively of fibres and of thermoplastic in a static press) or a continuous one (generally comprising pressing said layers in between rolls), the latter one being preferred because it is cheaper and faster than the former, reason why it is generally used on an industrial scale. Quite surprisingly, while reinforcements obtained by this continuous process contain fibres up to 0.05 mm from their surface, they nevertheless lead to quite good performances (welds) in the frame of the invention.

The size of the reinforcement used in the invention is adapted to facilitate the preheating thereof and the welding thereof to the wall of the hollow body, while ensuring a high-performance reinforcing effect. Its surface area is preferably in the range of the tens of $cm^2$ (typically between 50 and 1000 $cm^2$, or even between 100 and 500 $cm^2$).

In order for the reinforcement to be mechanically effective, its tensile strength is preferably at least 2000 MPa, or even at least 3000 MPa; in certain cases, it may even be advantageous to have a strength of at least 5000 MPa, or even 10 000 MPa.

According to one advantageous variant of the invention, the reinforcement comprises openings (holes) so as to avoid occlusions of air between said reinforcement and the wall of the hollow body. The dimension of these openings may typically be in the mm range.

The portion of the surface of the wall where the reinforcement is welded can be a portion of the outer surface (i.e. the one in contact with the atmosphere) or a portion of the inner surface (in contact with the interior of the hollow body), and of course, the case where both a portion of the outer and of the inner surface comprises a welded reinforcement is not excluded from the scope of the present invention.

When the reinforcement is welded to a portion of the interior surface of a fuel tank, this is preferably done while moulding said tank, preferably from two sheets eventually cut from a same cylindrical parison, more preferably using a method as the one described in patent application WO 2008/040766 to the applicant, which is incorporated by reference in the present application.

However, the reinforcement can also (or additionally) be welded to a finished a hollow body, which has been moulded before and has already cooled down.

Therefore, the present invention also relates to a process for manufacturing a hollow body as described above, according to which:
the portion of the outer surface of the hollow body where the reinforcement will be welded is heated;
the fibrous reinforcement is also heated so as to soften or even preferably melt the thermoplastic of the reinforcement; and
the reinforcement is moved to an applied to said portion of the outer surface of the hollow body, and according to which the step of applying the reinforcement to said portion of the outer surface of the hollow body comprises:
applying an initial pressure on at least one portion of the reinforcement;

applying pressure for the final welding using robotized pressure applying means.

The initial pressure exerted on at least a portion of the reinforcement allows the reinforcement sticking enough to the hollow body, so that it can remain in position until the final pressure is applied by the robotized pressure applying means.

In a preferred embodiment, the robotized pressure applying means apply the final pressure in a way that allows minimizing folds and bubbles and that ensures a homogeneous pressure. The robotized pressure applying means can for instance include at least one roller.

According to the invention, the reinforcement and the portion of the outer surface of the hollow body where the reinforcement will be welded are heated before carrying out the welding. Among existing heating techniques, mention may be made of:
rotational heating;
vibrational heating;
ultrasonic heating;
induction heating;
microwave heating;
heating via heating resistors;
heating using a heated metal block (also called "hot plate");
hot gas heating;
infrared (IR) heating;
laser heating.

Among these techniques, those implying no contact with the heat source are preferred because they allow heating 3D surfaces and because as already explained above, reactive binders (additives) are often used in the reinforcements so that their surface sticks. Alternatively, a contact tool could be used provided the surface layers of the reinforcement are free of additives. Tools made of specific copper alloys could also be used.

Among the above listed "non contact" techniques, IR heating is preferred because it is compatible will all plastic materials and fibres, quick and rather cheap. Preferably, the IR radiation melts all the thermoplastic material of the reinforcement and the wall of the hollow body on a thickness of at least 0.5 mm. In the case of a multilayer hollow body (like a fuel tank with a barrier layer for instance), the barrier layer is ideally not melted. For classical HDPE/EVOH tanks, the melt depth is preferably not more than 1 mm, ideally approximately 0.5 mm.

A polyethylene matrix absorbs principally in the range of medium IR (3-8 µm in wave length). However, short IR (1.4-3 µm in wave length) and medium IR can both be used. Short IR heaters have a deeper penetration and more reactivity. Short IR heaters need only a few seconds to reach their maximum temperature while medium IR heater need a few minutes. Typically, medium IR heaters must be kept switched on during all the production time, while short IR heaters can be switched on and off during the process.

Therefore, short IR heaters are preferred. IR heaters exist in many commercial forms (ceramic, lamp with Tungsten filament, lamp with carbon filament, . . . ). A preferred version of this invention consists in using a short IR heater with a Tungsten filament inside a quartz tube preferably integrating a gold reflector in order to allow controlling the direction of the radiations. The heating power and the distance between the heater and the sample are preferably optimized. Good results were obtained in the case of HDPE samples by placing the samples at 10 mm to 200 mm (preferably at 80 to 180 mm) of the heater with a heating power density around 130 kw/m². Good results are also obtained when using several lamps of different heating power, the most powerful ones being used on the borders of the reinforcement.

In order to be able to completely melt the thermoplastic of the reinforcement, said reinforcement is preferably put on a grid and IR heated at least on 1 side. This can be done by using a movable grid which can be inserted between two IR heaters fixed on a chassis as shown in FIG. 1, or between one IR module placed on top of the reinforcement/grid and a reflective surface at the bottom of the reinforcement, underneath the grid, to improve the efficiency of the heating. In these embodiments, the grid preferably has a specific design (small contact surface) to prevent the reinforcement from sticking and to allow an efficient and homogenous melting.

In order to be able to perform the welding of the reinforcement on a HDPE hollow body, the temperature at the surface of the hollow body is preferably above 140° C. (10° C. above the melt temperature of HDPE) for at least 10 seconds, which is the time generally required to take the reinforcement and to position it at the surface of the body.

Figure 2:
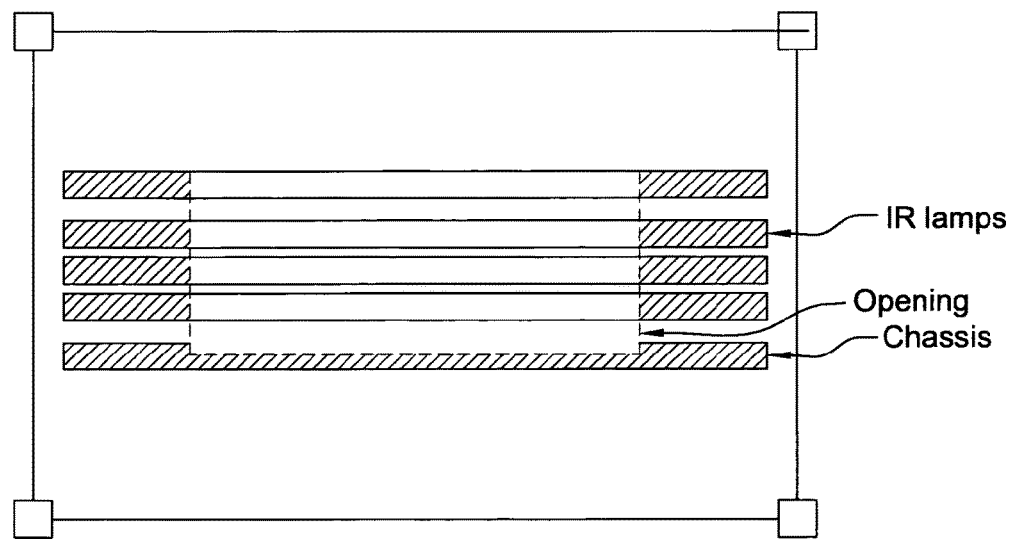

In order to prevent damaging accessories that would be on/in the hollow body and also, to prevent deforming the hollow body too much during welding, the area heated is preferably limited to the welding area. This can for instance be done by using tailor made IR lamps, or by using a "mask". In that embodiment, a metal plate, eventually cooled down with a water circuit, is placed between the heater(s) and the hollow body. The metal plate preferably has an opening, preferably in its centre, with a shape and size similar to those of the reinforcement. Such an embodiment (a variant of which is illustrated in FIG. 2 attached) allows using standard commercial IR "lamps", which is of course cheaper than tailor made ones.

According to the invention, once the reinforcement and the welding portion of the hollow body are heated, the reinforcement is moved to and applied to said portion by exerting a force that makes it possible to weld the two elements. Thanks to the thickness and the fibre content of the reinforcement according to the invention, when said reinforcement is locally pressed on the hollow body (for instance: on the upper part of a 3D surface), it will remain there undeformed until pressure is applied to it for the final welding, which allows minimizing folds and bubbles. In the case of a welding zone comprising a 3D surface, it might be advantageous for the reinforcement to be shaped before heating (by thermoforming for instance), during heating, during transport or during welding.

The moving and welding operations have to be as fast as possible to maintain the reinforcement in a molten state. It has been observed that the reinforcement stays in melted state up to 10 s after the heating. In an industrial process, these operations are preferably automated so that use can be made of robotized gripping means and of robotized pressure applying means. Both means can be the same device (for instance: suction cups made of plastic or of metal and mounted on springs) or they can be separate devices (for instance: suction cups as grippers and at least one roller as pressure applying means). When they are separate devices, they are nevertheless advantageously combined on a same robotic support so as to avoid encumbering the working space around the hollow body. In a preferred embodiment, a same robot arm is equipped with both means and even more preferably (because it is a very compact design), they are located on both sides of a robot hand mounted on a robot arm and which can pivot from one position (gripping) to another (pressure applying).

In a preferred embodiment, the hand of the robot is equipped:

On the first side with at least 1 row of suction cups, mounted on a rail. Each suction cup is preferably fixed on a knuckle so that it can be oriented to the reinforcement, even on 3D surface.

On the second side with a roller. The roller can be in 1 section or in several sections to have a better contact with the hollow body surface. The hardness of the roller is preferably adapted to fit with the homogeneity of the hollow body surface.

Figure 3:
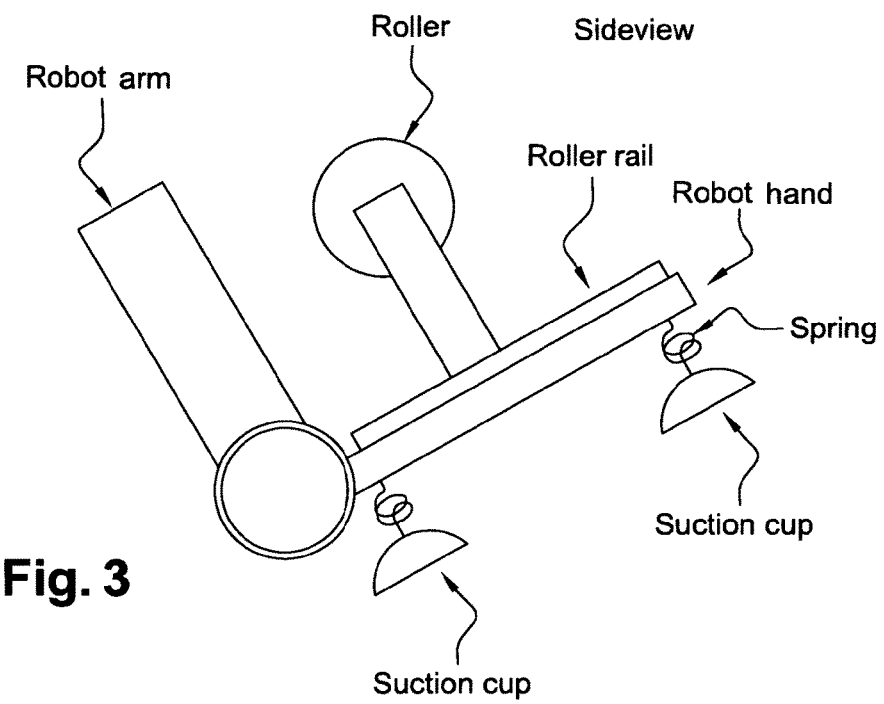

This embodiment is illustrated by FIGS. 3 (side view of the robot hand) and 4 (top view of the robot hand) attached.

According to the invention, the reinforcement is pressed on the hollow body surface to achieve a good welding (and not only a sticking). In the embodiment described above, an initial pressure is applied via the suction cups. The suction cups can be mounted on springs for more flexibility. Then, the roller passes on the surface of the reinforcement. The pressure is typically in the range of 70 to 80 MPa. The roller can be mounted on a rail in order to simplify the movements of the robot hand (if needed).

Another embodiment of the invention consists in using only the suction cups to press on the reinforcement. In this case, a roller is not needed. This embodiment is based on the fact that the efficiency of the reinforcement will not vary if 10% of the surface is not welded (between the suction cups).

Suction cups and/or roller are preferably made of a material which will not stick to the hot reinforcement. Specific elastomers (fluorinated or silicone containing ones for instance) or copper alloys (see above) can be used.

The hollow body shell tends to deform during the heating phase, especially since the reinforcement is pressed on its surface. Hence, in order to limit the deformation, a preferred solution consists in applying an internal pressure to the hollow body (between 20 and 100 mbar, preferably between 50 and 80 mbar) during heating, during welding and/or after welding. This pressure can be constant during the heating phase and increased during welding of the reinforcement on the hollow body. A preferred embodiment consists in applying air pressure (rather than water). Another option (compatible with the former ones) is to place the hollow body on a post blowing cooling shell after welding. In this case, an internal air pressure is applied (typically in the range of 100 mbar to 1500 mbar, preferably from 200 to 500 mbar, depending on hollow body geometry).

The present invention also relates to the use of a hollow body (obtained by a process) as described above as a fuel tank for a (hybrid) vehicle. This tank may also be used in a conventional vehicle, where the reinforcing effect obtained may be taken advantage of to avoid the use of the metal straps that are generally used to prevent the creep of the lower wall of the tank when the tank is fastened to the bottom of the vehicle body. The presence of the reinforcement could also make it possible to reduce the thicknesses of the tank, giving rise to a reduction in the weight and an increase in the working volume.

It should also be noted that the reinforcing effect obtained by the subject of the invention may be (and preferably is) combined with the use of other known reinforcements such as straps, kiss points, internal reinforcements (rods, partitions), overmoulded fabrics, etc. mentioned above and any other type of both internal and external reinforcement (all the more so since the first type makes it possible to contribute to obtaining a compression-resistant zone). The combination of the invention with these known techniques makes it possible to reduce the size and/or the amount of kiss points, internal reinforcements (rods, partitions), overmoulded fabrics, etc. Thus the weight of the final solution is minimized and the working volume of the tank is maximized.

Figure 4:
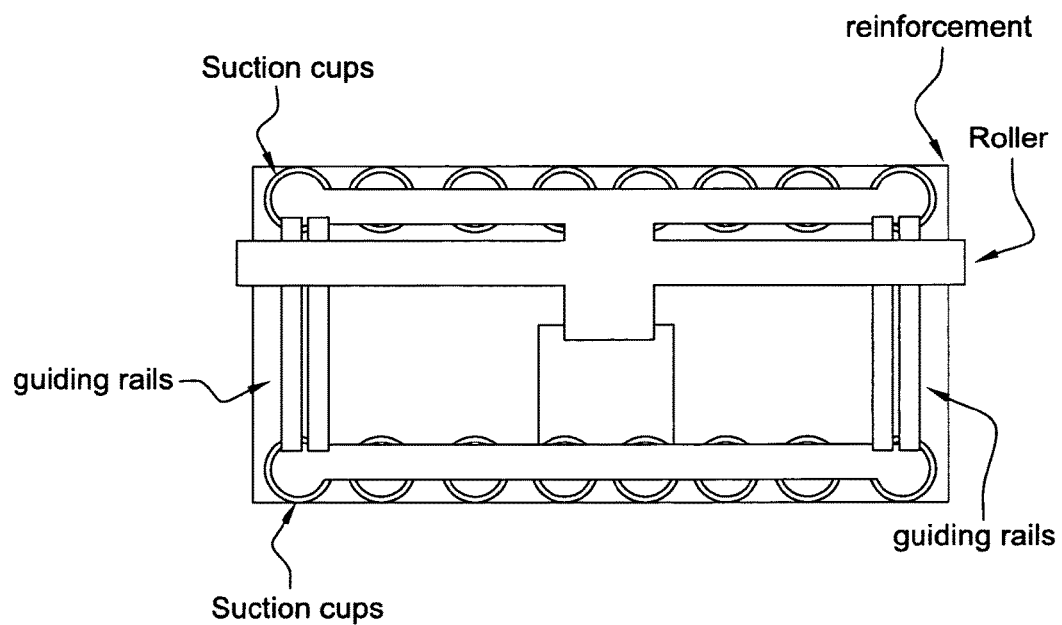

As already explained above, the present invention is illustrated, non-limitingly, by appended FIGS. 1 to 4 which schematically represent:

FIG. 1: a heating station for heating a reinforcement according to an embodiment of the invention and comprising a movable grid inserted between two IR heaters fixed on a chassis;

FIG. 2: a heating station for heating a tank according to an embodiment of the invention and comprising a mask allowing to only heat the welding zone of the tank, and lamps mounted on a chassis; and FIGS. 3 and 4: side and top views of a robot hand with respectively suction cups on one side and a roller on the other side.

The invention claimed is:

1. A process to manufacture a hollow body including a thermoplastic wall and a fibrous reinforcement welded on at least one portion of a surface of the hollow body, the fibrous reinforcement including a thermoplastic similar to or compatible with that of the wall of the hollow body, having a thickness of at least 1 mm and including from 30 to 60% in weight of fibers, the process comprising:
   heating a portion of the surface of the hollow body where the fibrous reinforcement will be welded;
   heating the fibrous reinforcement to soften or melt the thermoplastic of the fibrous reinforcement; and
   gripping and moving the reinforcement using suction cups and applying the reinforcement to the portion of the surface of the hollow body,
   wherein the suction cups and a robotized pressure applying device are located on a same robot hand,
   wherein the applying the reinforcement to the portion of the surface of the hollow body further comprises:
   applying an initial pressure on at least one portion of the fibrous reinforcement;
   pivoting the robot hand from a gripping position to a pressure applying position; and
   applying pressure for a final welding using the robotized pressure applying device,
   wherein the pivoting is conducted between the applying of the initial pressure and the applying of the pressure for the final welding.

2. The process according to claim 1, wherein the robotized pressure applying device includes at least one roller.

3. The process according to claim 1, wherein a welding portion comprises a 3D surface and the fibrous reinforcement is shaped during the final welding.

4. The process according to claim 1, further comprising applying an internal pressure to the hollow body during the heating, during the heating the portion of the surface of the hollow body, during the final welding, and/or after the final welding.

5. The process according to claim 1, wherein the heating the portion of the surface of the hollow body and the fibrous reinforcement uses infrared radiation (IR).

6. The process according to claim 1, wherein the fibrous reinforcement is put on a grid and infrared radiation (IR) heated on at least one side.

7. The process according to claim 1, further comprising using a movable grid upon which the fibrous reinforcement is put, the movable grid being insertable between two infrared radiation (IR) heaters fixed on a chassis or between an IR module placed on top of the reinforcement/grid and a reflective surface underneath the reinforcement/grid to heat the fiber reinforcement.

8. The process according to claim 1, further comprising using a heater and a mask or metal plate cooled down with a water circuit, which is placed between the heater and the hollow body, and which has an opening with a shape and size similar to those of the fibrous reinforcement to heat the fibrous reinforcement.

9. The process according to claim 1, wherein the hollow body comprises a wall that defines an internal volume for storing and/or transporting a fluid on board a vehicle and is obtained by blow molding.

10. The process according to claim 9, the hollow body being a vehicle fuel tank, or a hybrid vehicle fuel tank, a filler pipe, a turbo charger duct, or an ammonia precursor tank of an SCR system.

11. The process according to claim 1, wherein the fibrous reinforcement comprises continuous fibers that are woven.

12. The process according to claim 1, wherein the fibrous reinforcement comprises glass fibers.

13. The process according to claim 1, wherein the fibrous reinforcement contains fibers up to 0.05 mm from its surface.

14. The process according to claim 1, wherein at least one row of the suction cups is mounted on a rail.

15. The process according to claim 14, wherein each suction cup is fixed on a knuckle.

16. The process according to claim 14, wherein each suction cup is mounted on a spring.

17. The process according to claim 14, wherein the initial pressure is applied via the suction cups.

18. A process to manufacture a hollow body including a thermoplastic wall and a fibrous reinforcement welded on at least one portion of a surface of the hollow body, the fibrous reinforcement including a thermoplastic similar to or compatible with that of the wall of the hollow body, having a thickness of at least 1 mm and including from 30 to 60% in weight of fibers, the process comprising:
   using a movable grid upon which the fibrous reinforcement is put, the movable grid being inserted between two infrared radiation (IR) heaters fixed on a chassis or between an IR module placed on top of the reinforcement/grid and a reflective surface underneath the reinforcement/grid to heat the fibrous reinforcement;
   heating a portion of the surface of the hollow body where the fibrous reinforcement will be welded;
   heating the fibrous reinforcement to soften or melt the thermoplastic of the fibrous reinforcement; and
   moving the reinforcement and applying the reinforcement to the portion of the surface of the hollow body,
   wherein the applying the reinforcement to the portion of the surface of the hollow body comprises:
      applying an initial pressure on at least one portion of the fibrous reinforcement; and
      applying pressure for a final welding using a robotized pressure applying device.

19. A process to manufacture a hollow body including a thermoplastic wall and a fibrous reinforcement welded on at least one portion of a surface of the hollow body, the fibrous reinforcement including a thermoplastic similar to or compatible with that of the wall of the hollow body, having a thickness of at least 1 mm and including from 30 to 60% in weight of fibers, the process comprising:
   using a heater and a mask or metal plate cooled down with a water circuit, which is placed between the heater and the hollow body, and which has an opening with a shape and size similar to those of the fibrous reinforcement to heat the fibrous reinforcement;
   heating a portion of the surface of the hollow body where the fibrous reinforcement will be welded;
   heating the fibrous reinforcement to soften or melt the thermoplastic of the fibrous reinforcement; and
   moving the reinforcement and applying the reinforcement to the portion of the surface of the hollow body,
   wherein the applying the reinforcement to the portion of the surface of the hollow body comprises:
      applying an initial pressure on at least one portion of the fibrous reinforcement; and
      applying pressure for a final welding using a robotized pressure applying device.

20. A process to manufacture a hollow body including a thermoplastic wall and a fibrous reinforcement welded on at least one portion of a surface of the hollow body, the fibrous reinforcement including a thermoplastic similar to or compatible with that of the wall of the hollow body, having a thickness of at least 1 mm and including from 30 to 60% in weight of fibers, the process comprising:
   heating a portion of the surface of the hollow body where the fibrous reinforcement will be welded;
   heating the fibrous reinforcement to soften or melt the thermoplastic of the fibrous reinforcement; and
   gripping and moving the reinforcement using suction cups and applying the reinforcement to the portion of the surface of the hollow body,
   wherein the suction cups and a robotized pressure applying device are located on a same robot hand,
   wherein the applying the reinforcement to the portion of the surface of the hollow body further comprises:
      applying an initial pressure on at least one portion of the fibrous reinforcement;
      pivoting the robot hand from a gripping position to a pressure applying position; and
      applying pressure for a final welding using the robotized pressure applying device,
   wherein the suction cups are located on one side of the robot hand mounted on a robot arm and the robotized pressure applying device is located on an other side of the robot hand.

\* \* \* \* \*